(12) United States Patent
Satish et al.

(10) Patent No.: US 7,908,391 B1
(45) Date of Patent: Mar. 15, 2011

(54) APPLICATION STREAMING AND NETWORK FILE SYSTEM OPTIMIZATION VIA FEATURE POPULARITY

(75) Inventors: Sourabh Satish, Fremont, CA (US); William E. Sobel, Jamul, CA (US); Brian Hernacki, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 427 days.

(21) Appl. No.: 12/055,021

(22) Filed: Mar. 25, 2008

(51) Int. Cl.
G06F 15/16 (2006.01)

(52) U.S. Cl. .......................................... 709/232; 709/206
(58) Field of Classification Search .................. None
See application file for complete search history.

(56) References Cited

U.S. PATENT DOCUMENTS

| | | | | |
|---|---|---|---|---|
| 5,764,593 | A * | 6/1998 | Turpin et al. | 713/2 |
| 5,878,223 | A * | 3/1999 | Becker et al. | 709/223 |
| 6,341,304 | B1 * | 1/2002 | Engbersen et al. | 709/203 |
| 6,578,079 | B1 * | 6/2003 | Gittins | 709/229 |
| 6,895,084 | B1 * | 5/2005 | Saylor et al. | 379/88.22 |
| 7,523,191 | B1 * | 4/2009 | Thomas et al. | 709/224 |
| 2002/0052925 | A1 * | 5/2002 | Kim et al. | 709/217 |
| 2002/0073245 | A1 * | 6/2002 | Hallford | 709/331 |
| 2002/0078255 | A1 * | 6/2002 | Narayan | 709/316 |
| 2002/0087717 | A1 * | 7/2002 | Artzi et al. | 709/236 |
| 2002/0147770 | A1 * | 10/2002 | Tang | 709/203 |
| 2003/0018679 | A1 * | 1/2003 | Sokolov et al. | 709/1 |
| 2003/0041143 | A1 * | 2/2003 | Ronald et al. | 709/224 |
| 2003/0088554 | A1 * | 5/2003 | Ryan et al. | 707/3 |
| 2003/0158975 | A1 * | 8/2003 | Frank et al. | 709/331 |
| 2004/0172389 | A1 * | 9/2004 | Galai et al. | 707/3 |
| 2004/0205505 | A1 * | 10/2004 | Vans et al. | 715/501.1 |
| 2004/0215526 | A1 * | 10/2004 | Luo et al. | 705/26 |
| 2004/0215719 | A1 * | 10/2004 | Altshuler | 709/204 |
| 2005/0132063 | A1 * | 6/2005 | Belt et al. | 709/227 |
| 2008/0010118 | A1 * | 1/2008 | Howell et al. | 705/14 |
| 2008/0059631 | A1 * | 3/2008 | Bergstrom et al. | 709/224 |
| 2008/0059721 | A1 * | 3/2008 | Turner et al. | 711/154 |
| 2008/0071859 | A1 * | 3/2008 | Seed et al. | 709/203 |
| 2008/0091840 | A1 * | 4/2008 | Guo et al. | 709/231 |
| 2008/0109750 | A1 * | 5/2008 | Lin-Hendel | 715/785 |
| 2008/0163185 | A1 * | 7/2008 | Goodman | 717/151 |
| 2008/0201225 | A1 * | 8/2008 | Maharajh et al. | 705/14 |
| 2009/0276488 | A1 * | 11/2009 | Alstad | 709/203 |

* cited by examiner

*Primary Examiner* — Bunjob Jaroenchonwanit
(74) *Attorney, Agent, or Firm* — Brill Law Office; Jeffrey Brill

(57) ABSTRACT

The performance of a remotely originated application is improved by determining the most popular application features, and proactively making the corresponding application content available to local computers on which the application runs. An application streaming or network file system transmits an application to a plurality of endpoints for execution. The server determines the relative popularity of the application features, and maps the features to corresponding application content. The server proactively pushes the application content corresponding to the most popular features to the endpoints. The popularity of application features is dynamically updated on a regular, ongoing basis. The proactive pushing of code pages is kept current with the updated popularity determinations.

20 Claims, 1 Drawing Sheet

APPLICATION STREAMING AND NETWORK FILE SYSTEM OPTIMIZATION VIA FEATURE POPULARITY

TECHNICAL FIELD

This invention pertains generally to application streaming technology and network file systems, and more specifically to optimizing transmission of application content from a server for remote execution, based on application feature popularity.

BACKGROUND

Application streaming provides the ability for an endpoint (e.g., a client computer) to run an application locally that is stored remotely, for example on a server. The server transmits specific portions of the application (e.g., code pages) to the endpoint, as the endpoint needs them. Application streaming offers a number of advantages over running the application on the server. Streaming the application allows the application to execute locally on the endpoint, instead of remotely on the server. This eliminates the need for large farms of servers to provide applications to a plurality of client computers. Application response time to the user is also significantly faster when the application is run locally on the endpoint, as opposed to remotely on the server. Commercial application streaming technology exists today.

A network file system is a computer file system that supports sharing of resources such as files, printers and/or persistent storage over a computer network. Network file systems such as Andrew File System (AFS), NetWare Core Protocol (NCP), and Server Message Block (SMB, also known as Common Internet File System (CIFS)) exist today. Network file systems can share files, including executable files, between servers and endpoints.

An important performance measurement of a network file system is the amount of time needed to satisfy service requests. In conventional file systems, this time consists of a disk-access time and a small amount of CPU-processing time. But in a network file system, a remote access has additional overhead due to the distributed structure. This includes the time to deliver the request to a server, the time to deliver the response to the client, and for each direction, a CPU overhead of running the communication protocol software.

Both application streaming technologies and network file systems can be used to execute applications stored on a remote server on a local endpoint. When a server streams application content to an endpoint, the endpoint typically stores that content in a cache, so that the server need not retransmit duplicate application content to the same endpoint.

Current application streaming technologies and network file systems do not take into account which features of an application being transmitted for execution on an endpoint are most popular, and/or are being most frequently being utilized by the user. Where application content is already stored in the cache, the associated application feature(s) run much more quickly on the endpoint, as the application content is already present and does not need to be transmitted across the network. However no known application steaming or network file system technology attempts to dynamically track application feature popularity and real-time usage, so as to optimize application content transmission and cache management to improve the user experience.

It would be desirable to have application streaming technology and network file systems that do not have these problems.

SUMMARY

The performance of a remotely originated application is improved by determining the most popular application features, and proactively making the corresponding application content available to local computers on which the application runs. More specifically, an application streaming or network file system transmits an application to a plurality of endpoints for execution. The server determines the relative popularity of the application features, and maps the features to corresponding application content. The server proactively pushes the application content corresponding to the most popular features to user's computers, so that those features can be executed locally without having to request the relevant application content and wait while it downloads. The popularity of application features can be dynamically updated on a regular, ongoing basis. The proactive pushing of code pages can be kept current with the updated popularity determinations, such that endpoints always have the code pages for the most popular features, without having to request them.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
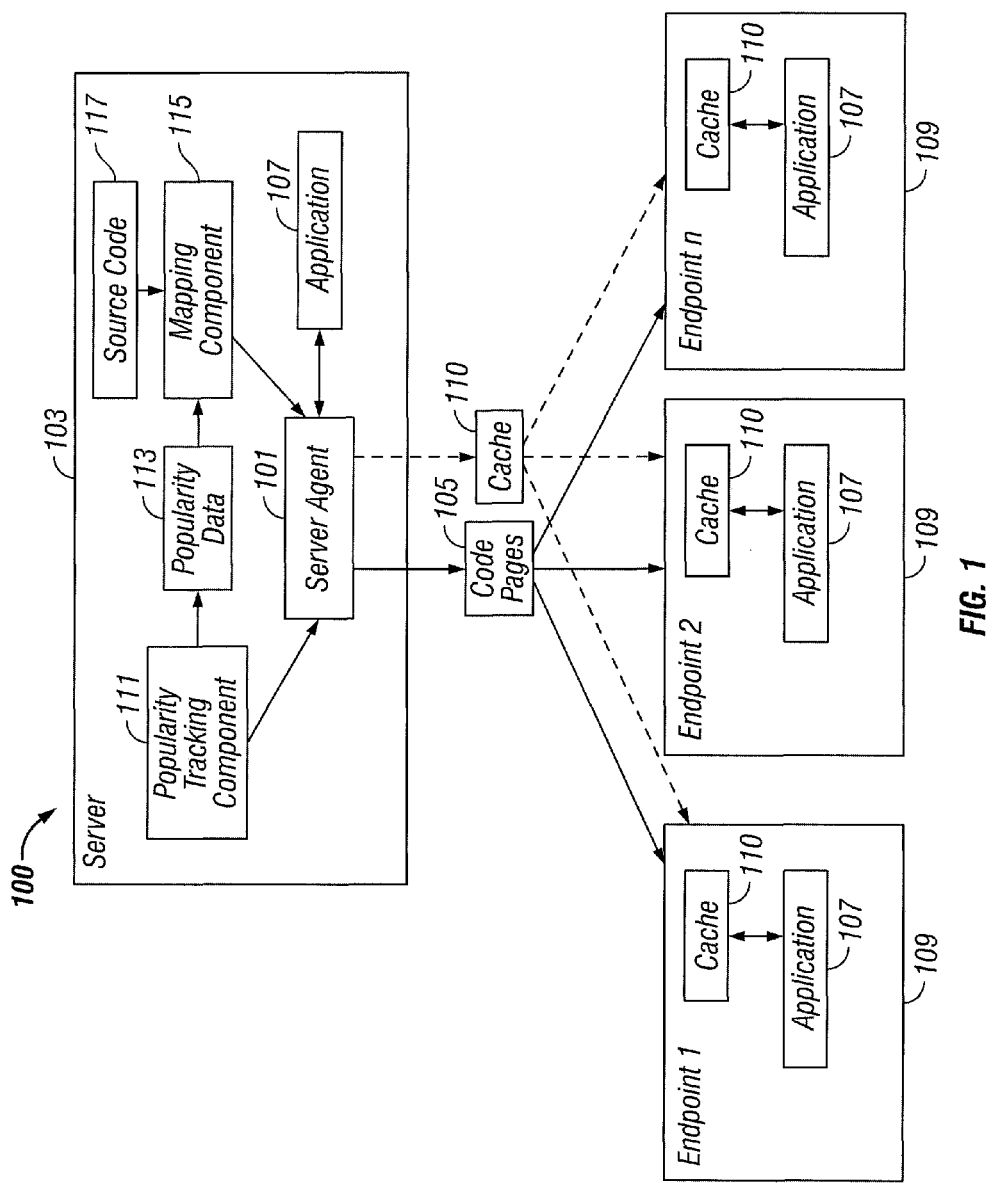
FIG. 1 is a block diagram illustrating optimizing transmission of application content from a server to a plurality of endpoints, based, on application feature popularity, according to other embodiments of the present invention.

The FIGURES depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates a system 100 for optimizing transmission of application content from a server 103 to a plurality of endpoints 109, based on application feature popularity, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated, in FIG. 1, a server agent 101 running on an application streaming or network file system server 103 transmits code pages 105 of applications 107 to a plurality of endpoints 109, such that the transmitted applications 107 are executed on the endpoints 109. For the sake of illustration, FIG. 1 shows one only application 107 being transmitted to three endpoints 109, but it is to but it is to be understood that an application streaming or remote file system typically transmits many applications 107 to a large plurality of endpoints 109, the endpoints 109 sometimes being very diverse geographically. When a server 103 transmits application code pages 105 to an endpoint 109, the endpoint 109 typically stores those code pages 105 in a cache 110, so that the server 103 need not retransmit duplicate application content to the same endpoint 109.

A popularity tracking component 111 dynamically determines application feature popularity, and feeds this popularity data 113 to the server agent 101. The server agent 101 uses the popularity data 113 to determine which code pages 105 of the application 107 to proactively push to endpoints 109. In one embodiment the popularity tracking component 111 is in the form of a known feature popularity tracking technology. A number of application feature popularity tracking packages are available today, and the implementation mechanics of such technology in the context of the present invention will be readily apparent to one of ordinary skill in the relevant art in light of this specification. Another embodiment uses the application tracking methodology disclosed in the pending patent application titled "Application Streaming Profiling," having the same assignee as the present application, filed on Feb. 28, 2008 and now bearing Ser. No. 12/039,515 ("the Profiling Application"). The Profiling Application is herein incorporated by reference. The use of the application tracking methodology disclosed in the Profiling Application to dynamically determines application feature popularity will be readily apparent to one of ordinary skill in the relevant art in light of this specification and the incorporated specification of the Profiling Application. In yet other embodiments, the popularity tracking component 111 itself tracks which application features are most popular on the basis of the interaction of existing users with applications 107 transmitted from the server 103 to the plurality of endpoints 109.

A mapping component 115 maps specific code pages 105 of an application 107 to specific program features. An application developer or the like provides the source code 117 for the application 107 being analyzed. The mapping component 115, by referring to the corresponding source code 117, can map specific code pages 105 back to specific program functionality, at least approximately. In some embodiments, some or all of this mapping is entered by, for example, an application developer, who has access to both the source code 117 and the popularity data 113. In FIG. 1, the mapping component 115 is illustrated as running on the server 103. In other embodiments, this component can run at other locations, as desired.

It is to be understood that how much of the mapping is performed automatically by the mapping component 115, and how much is input by, e.g., an application developer, is a variable design parameter. The implementation mechanics of performing such mapping based on the popularity data 113 and the application source code 117 are within the skill set of one of ordinary skill in the relevant art, and the usage thereof within the context of the present invention will be readily apparent to one of such a skill level in light of this specification.

Once code pages 105 of an application 107 have been mapped to program features, the server agent 101 can proactively push specific code pages 105 so that the most popular features are readily available on endpoints 109, and thus the performance of the application 107 is improved. For example, the server agent 101 can push code pages 105 associated with the most popular features before an endpoint 109 even requests them. This way, the endpoint 109 receives the code pages 105 it is most likely to utilize during the execution of the application 107, before it needs the code it needs the code pages 105, and without having to request them. The endpoint 109 stores received code pages 105 in the cache 110, and thus when the user wishes to execute popular application features, the corresponding code pages 105 are already stored on the endpoint 109, and need not be transmitted from the server 103.

In one embodiment, the popularity tracking component 111 ranks the code pages 105 of each application 107 on the basis of the popularity of the corresponding features (e.g., with the code pages 105 corresponding to the most popular features rated highest). When a user starts running an application 107 on an endpoint 109, the server agent 101 promptly consults the ranking order of code pages 105, and proactively pushes the pages 105 corresponding to the most popular features. The endpoint 109 thus automatically receives and caches code pages 105 corresponding to those application features that have the highest likelihood (on the basis of popularity) of being executed. The number of code pages 105 to proactively push can be determined by, e.g., the size of the cache 110.

In some embodiments, the popularity tracking component 111 receives or calculates updated popularity data 113 on a regular basis in real time, e.g., X times per Y period of time. The popularity tracking component 111 and and mapping component 115 therefore re-determine the most popular features and their corresponding code pages 105, and the specific pages 105 to proactively push can change as various features become more and less popular over time. As the popularity data 113 can be determined based on the actions of many users in the field, it can be very dynamic in nature, as it changes in synchronization with the latest feature trends.

It is to be understood that code pages 105 can encompass application functionality instantiated across one or more binary files, including dependent binaries such as dynamic link libraries and other late binding objects. Therefore, the rating and/or proactive pushing of code pages 105 can be implemented across all the binary files that constitutes an application 107, and not simply within a single executable image.

The server agent 101 can also utilize the above described methodology to build a default cache 110 to push to one or more endpoints 109 as desired. With a preloaded cache 110 including the code pages 105 mapped to the most popular features, a user can benefit from the improved performance without delay. This concept can be extended to building and transmitting a seeded cache 110 whenever a preloaded cache 110 may be desired, for example upon the establishment of a new endpoint 109, the deployment of a new application 107, version thereof, or update thereto, upon a significant change in feature popularity, etc. It is to be further understood that the server agent 101 can simply transmit specific code pages 105 corresponding to popular features to endpoints 109 under any of the above circumstances, without specifically building and pushing a seeded cache 110.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for optimizing transmission of application program content from a server for execution on an endpoint, the method comprising the steps of:
   determining, by a sever computer, a popularity measurement of each of a plurality of application program features;
   mapping code pages of the application to the application program features;
   identifying at least one code page of the application associated with at least one popular application program feature; and
   proactively transmitting said at least one identified code page of the application from the server to the endpoint, for execution of the application on the endpoint.

2. The method of claim 1 wherein transmitting said at least one identified code page of the application from the server to the endpoint, for execution of the application on the endpoint further comprises:
   proactively transmitting said at least one identified code page of the application from the server to the endpoint, without receiving a request for said at least one code page from the endpoint.

3. The method of claim 1 wherein transmitting said at least one identified code page of the application from the server to the endpoint, for execution of the application on the endpoint further comprises:
   receiving an indication from the endpoint that execution of the application is starting on the endpoint; and
   responsive to receipt of said indication, proactively transmitting said at least one identified code page of the application from the server to the endpoint, without receiving a request for said at least one code page from the endpoint.

4. The method of claim 1 further comprising:
   proactively transmitting a plurality of code pages associated with a specific subset of the application program features, said subset comprising most popular ones of the program features.

5. The method of claim 1 further comprising:
   dynamically updating the popularity measurement of at least one of the plurality of application program features.

6. The method of claim 5 further comprising:
   responsive to the updating step, proactively transmitting at least one additional code page of the application corresponding to at least one popular program feature from the server to the endpoint, for execution of the application on the endpoint.

7. The method of claim 5 further comprising:
   responsive to the updating step, re-ranking the popularity of the application program features of the plurality and proactively transmitting a plurality of code pages associated with a specific subset of the application program features, said subset comprising most popular ones of the program features.

8. The method of claim 1 further comprising:
   building a cache comprising code pages corresponding to a specific subset of the application program features, said subset comprising most popular ones of the program features; and
   proactively transmitting the cache to at least one endpoint, responsive to at least one event from a group of events consisting of:
      establishment of a new endpoint;
      endpoint;
      transmission of a new version of an application to at least one endpoint;
      transmission of an update to an application to at least one endpoint; and
      an update in popularity of application program features.

9. The method of claim 1 further comprising:
   proactively transmitting at least one code page of at least one application corresponding to at least one popular application program feature to at least one endpoint, responsive to at least one event from a group of events consisting of:
      establishment of a new endpoint;
      transmission of a new application to at least one endpoint;
      transmission of a new version of an application to at least one endpoint;
      transmission of an update to an application to at least one endpoint; and
      an update in popularity of application program features.

10. At least one non-transitory computer readable medium storing a computer program product for optimizing transmission of application program content from a server for execution on an endpoint, the computer program product comprising:
   program code for determining a popularity measurement of each of a plurality of application program features;
   program code for mapping code pages of the application to the application program features;
   program code for identifying at least one code page of the application associated with at least one popular application program feature; and
   program code for proactively transmitting said at least one identified code page of the application from the server to the endpoint, for execution of the application on the endpoint.

11. The computer program product of claim 10 wherein the program code for transmitting said at least one identified code page of the application from the server to the endpoint, for execution of the application on the endpoint further comprises:
   program code for proactively transmitting said at least one identified code page of the application from the server to the endpoint, without receiving a request for said at least one code page from the endpoint.

12. The computer program product of claim 10 wherein the program code for transmitting said at least one identified code page of the application from the server to the endpoint, for execution of the application on the endpoint further comprises:
  program code for receiving an indication from the endpoint that execution of the application is starting on the endpoint; and
  program code for, responsive to receipt of said indication, proactively transmitting said at least one identified code page of the application from the server to the endpoint, without receiving a request for said at least one code page from the endpoint.

13. The computer program product of claim 10 further comprising:
  program code for proactively transmitting a plurality of code pages associated with a specific subset of the application program features, said subset comprising most popular ones of the program features.

14. The computer program product of claim 10 further comprising:
  program code for dynamically updating the popularity measurement of at least one of the plurality of application program features.

15. The method computer program product of claim 14 further comprising:
  program code for, responsive to the updating step, proactively transmitting at least one additional code page of the application corresponding to at least one popular program feature from the server to the endpoint, for execution of the application on the endpoint.

16. The method computer program product of claim 14 further comprising:
  program code for, responsive to the updating step, re-ranking the popularity of the application program features of the plurality and proactively transmitting a plurality of code pages associated with a specific subset of the application program features, said subset comprising most popular ones of the program features.

17. The computer program product of claim 10 further comprising:
  program code for building a cache comprising code pages corresponding to a specific subset of the application program features, said subset comprising most popular ones of the program features; and
  program code for proactively transmitting the cache to at least one endpoint.

18. The method computer program product of claim 17 further comprising:
  program code for proactively transmitting the cache to at least one endpoint, responsive to at least one event from a group of events consisting of:
  establishment of a new endpoint;
  transmission of a new application to at least one endpoint;
  transmission of a new version of an application to at least one endpoint;
  transmission of an update to an application to at least one endpoint; and
  an update in popularity of application program features.

19. The computer program product of claim 10 further comprising:
  program code for proactively transmitting at least one code page of at least one application corresponding to at least one popular application program feature to at least one endpoint, responsive to at least one event from a group of events consisting of:
  establishment of a new endpoint;
  transmission of a new application to at least one endpoint;
  transmission of a new version of an application to at least one endpoint;
  transmission of an update to an application to at least one endpoint; and
  an update in popularity of application program features.

20. A computer system comprising hardware and software, for optimizing transmission of application program content from a server for execution on an endpoint, the computer system comprising:
  means for determining a popularity measurement of each of a plurality of application program features;
  means for mapping code pages of the application to the application program features;
  means for identifying at least one code page of the application associated with at least one popular application program feature; and
  means for proactively transmitting said at least one identified code page of the application from the server to the endpoint, for execution of the application on the endpoint.

* * * * *